June 17, 1924.

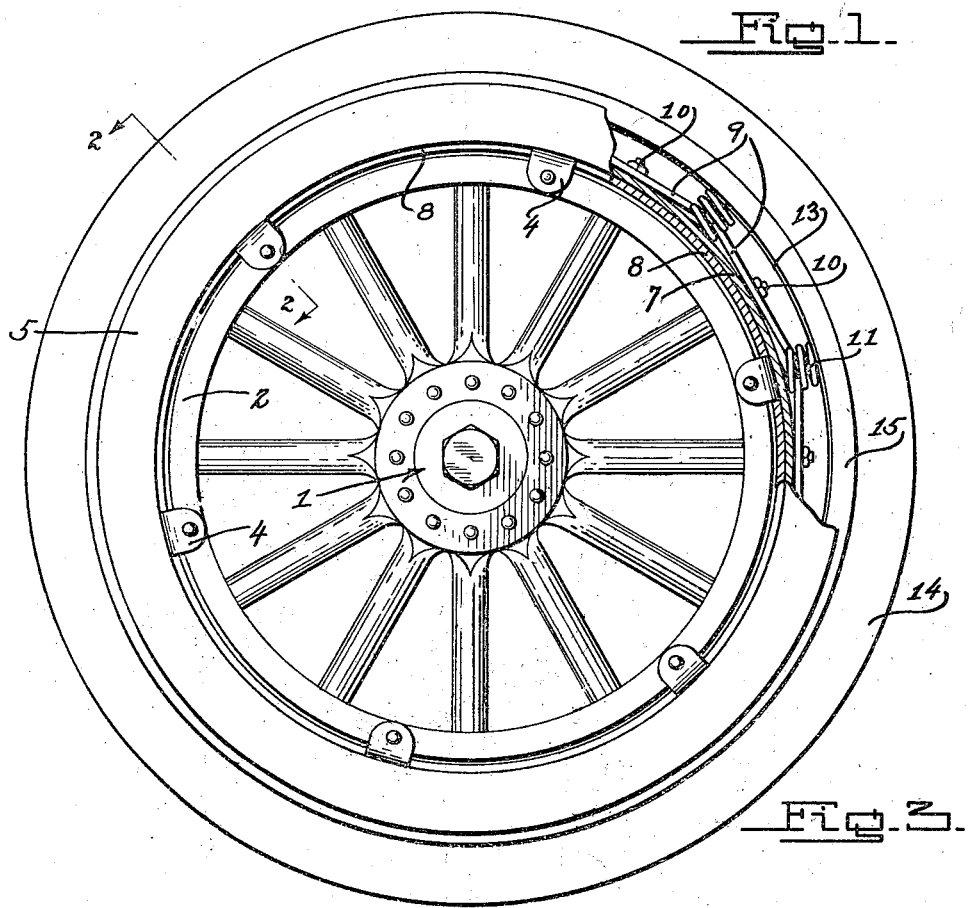
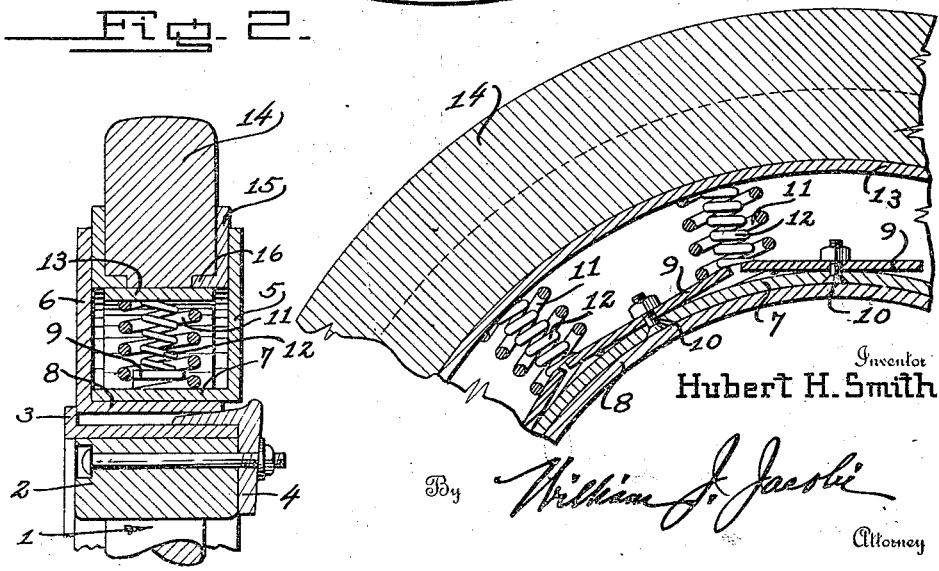

H. H. SMITH

SPRING WHEEL

Filed Feb. 10, 1923

Inventor
Hubert H. Smith
By William J. Jacobi
Attorney

Patented June 17, 1924.

1,498,404

UNITED STATES PATENT OFFICE.

HUBERT H. SMITH, OF KNOXVILLE, TENNESSEE.

SPRING WHEEL.

Application filed February 10, 1923. Serial No. 618,262.

*To all whom it may concern:*

Be it known that HUBERT H. SMITH, a citizen of the United States, residing at Knoxville, in the county of Knox and State of Tennessee, has invented certain new and useful Improvements in Spring Wheels, of which the following is a specification.

This invention relates to a spring wheel and has for its principal object to provide a device which may be readily attached to any ordinary construction of a vehicle wheel, and which will provide a cushioning means for the said wheel.

Another object of the invention is to provide a spring wheel of the above mentioned character, which is especially adapted for use with trucks and heavy motor vehicles but may also be adapted for use upon any other character of motor vehicle, wherein a flexible outer rim is provided arranged concentric to the wheel, and connected to the inner rim of the wheel by yieldable means whereby the shock or jar on the outer rim will not be transmitted to the axle but will be absorbed between the rim and the wheel.

A still further object of the invention is to provide a spring wheel of the above mentioned character, which is simple in construction, inexpensive, strong, durable and well adapted for the purpose of which it is designated.

Other objects and advantages of this invention will become apparent during the course of the following description.

In the accompanying drawings forming a part of the specification and in which like numerals designate like parts throughout the same, Figure 1 is a side elevation of the invention showing the annular plate partly broken away, and showing the arrangement of the spring means therein.

Figure 2 is a sectional view taken on line 2—2 of Figure 1.

Fig. 3 is a fragmentary longitudinal section in the plane of the wheel showing the manner in which the springs are supported between the annular plates.

Figure 6:
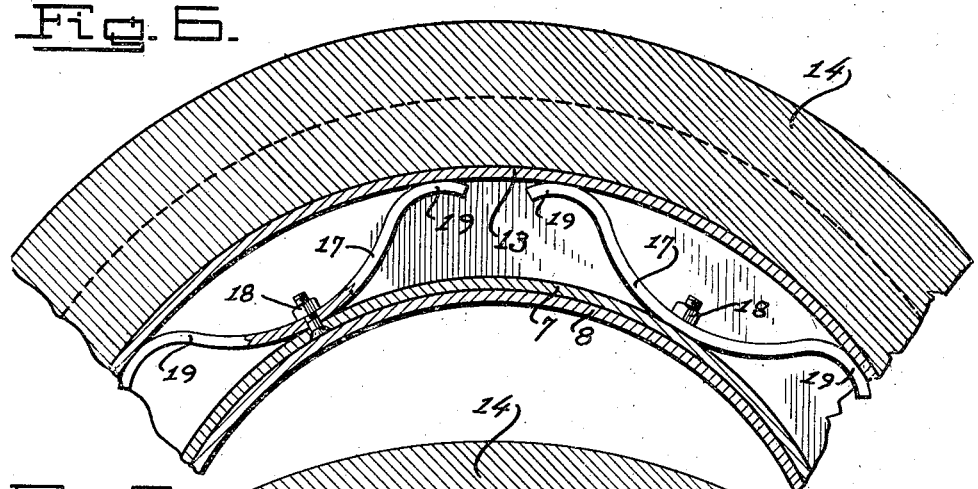
Figure 6 is a modification showing another form of spring means.

In the drawings wherein for the purpose of illustration is shown the preferred embodiment of my invention, the numeral 1 designates a wheel which is provided with a felly 2 having a felly band provided with flanged portion 3 on one side thereof and on the opposite side provided with detachable lugs 4 to permit the rim and the tire carried on the wheel 1 to be easily and quickly removed therefrom.

Adapted to be supported upon the felly 2 of the wheel 1 are a pair of annular plates 5 and 6 respectively which are provided at their inner periphery with lateral interfitting flanges 7 and 8 respectively. This construction is more clearly shown in Fig. 2 of the drawings. When the annular plates are fitted together in the manner as shown in Fig. 2 the flanged portions 7 and 8 will form a rim and for the purpose of convenience will hereinafter be called the inner rim. The flanged portion 8 of the inner rim is adapted to be secured to the felly 2 of the wheel 1 and the flanged portion 7 of the inner rim and of the annular plate 5 is adapted to support and secure one portion of the suitable spring supporting means hereinafter to be more fully described.

A number of plates 9 are secured intermediate their ends by suitable rivets or bolts shown at 10 in the drawings upon the upper face of the flange 7 and the ends of these plates 9 are spaced from each other and also are spaced from the flange 7 in the manner as shown in the drawings and adapted to be supported between the free ends of the supporting plates 9 are the lower portions of the coil springs 11. These coil springs 11 also are adapted to enclose a smaller coil spring 12 and the upper end of the coil springs 11 and 12 respectively are free and not supported by any fastening means. The purpose of such a construction will be more fully described in the following paragraphs.

A flexible outer preparatory rim 13 which supports the tire 14 thereon is arranged concentric with the wheel 1 and in spaced relation therewith and with the inner rim heretofore mentioned and is further adapted to be disposed between the annular plates 5 and 6 as more clearly shown in Fig. 2 of the drawings and is also adapted to move vertically therebetween.

"When in position between the annular plates 5 and 6 the bottom face of the outer rim 13 will rest against the upper free ends of the coil springs 11 and 12 and the coil springs 11 and 12 will normally hold the tire 14 in its extended or normal position. To further prevent the sides of the tire 14 from wearing due to the frictional engagement with the inner faces of the flange of the annular plates 5 and 6, I provide a suitable lining to be carried between the tire 14 and the rim 13 and so disposed as to fit between the annular plates 5 and 6 and this lining is designated by the numeral 15 and is provided with a plurality of spaced inwardly extending lugs 16 for the purpose of permitting the same to be held in position upon the outer rim 13 and adapted to fit against the side faces of the tire 14.

In the modification shown in Fig. 6 of the drawings the spring means comprises a flexible flat piece of metal designated by the numeral 17 and is fastened intermediate its ends by suitable fastening means 18 to the flange 7 and the free ends of this spring element 17 are curved upwardly and provided with curved heads 19 adjacent the free ends thereof. These curved heads 19 are adapted to engage the bottom face of the outer flexible rim 13 and performs the same functions as the coil springs 11 and 12 heretofore described.

Any number of these springs may be used as may be desired and the device is not limited to the number of spring elements used in connection with the wheel.

It will be evident that when shocks or jars are imparted to the flexible outer rim 13 at the lowest portion for instance, the spring element which happens to be at the point which is in engagement with the ground and in being compressed will force the tire 14 inwardly between the annular plates 5 and 6 and thereby the shock will be absorbed between the inner and outer ends and will not have any effect upon the axle of the wheel.

Figure 7:
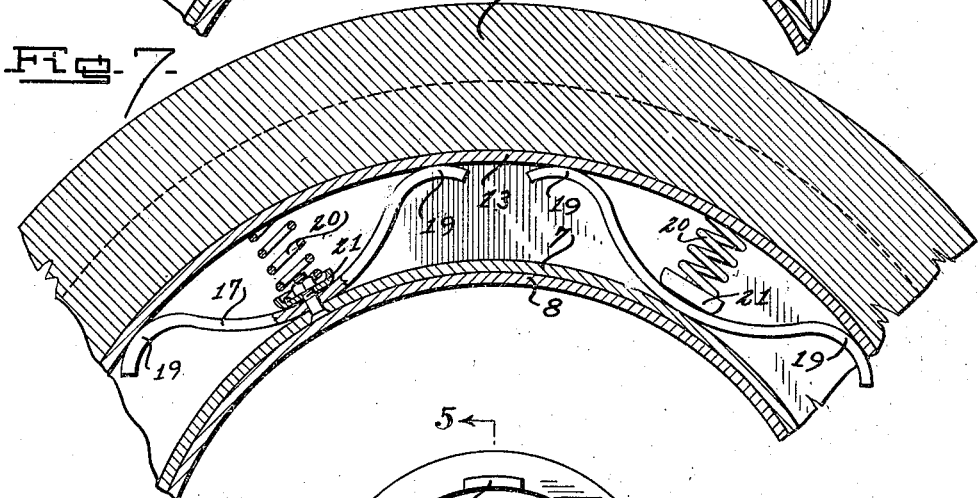
Figure 7 is a view similar to that shown in Figure 6 and showing coil springs associated with the flat springs.
Figures 4, 5:
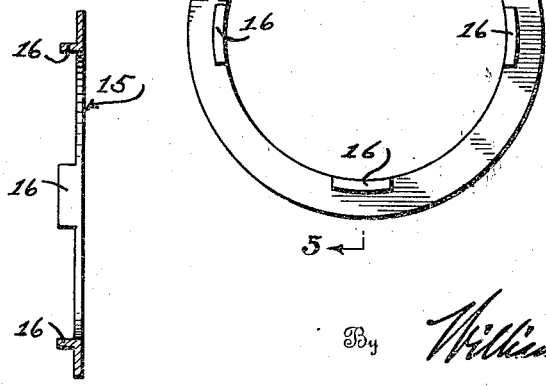
Figure 4 is a front elevation of one of the lining elements.
Figure 5 is a sectional view taken on line 5—5 of Figure 4.

In Figure 7 a still further modification of the spring means is shown wherein the spring element 17 is adapted to support on the fastening means 18 and between the curved free ends 19 a coil spring 20. The lower end of this coil spring 20 is housed in a cap 21 and the upper end is free to fit against the under face of the flexible rim 13.

It will thus be seen from the foregoing description that a spring wheel has been provided wherein the same may be more easily and quickly placed upon a wheel and furthermore, is of such a construction as to permit all of the elements to properly function and does not alter the construction of the wheel in any way. The simplicity of my spring wheel further renders the same more efficient in its operation and very cheap to manufacture.

From the foregoing description of the construction of my improved apparatus it will be seen that I have provided a simple, inexpensive and efficient means for carrying out the objects of the invention, and while I have particularly described the elements best adapted to perform the functions set forth, it is obvious that various changes in form, proportion and in the minor details of construction may be resorted to without departing from the spirit or sacrificing any of the principles of the invention.

What I claim as new and desire to secure by Letters Patent is:—

The combination with a wheel; of a pair of complementary annular plates provided at their inner peripheries with inwardly opposed and interfitting flanges forming a rim, means for detachably mounting said rim on the felly of said wheel, a flexible outer tire-carrying rim disposed between said plates, spring means between said rims normally retaining same concentric, a tire on said outer rim and a pair of annular ring-like lining members applied to the outer side faces of said tire to compensate for wear against said plates, said lining members having inwardly opposed lugs struck from the inner peripheries thereof at regular intervals to project between the tire and outer rim, as and for the purposes described.

In testimony whereof I affix my signature.

HUBERT H. SMITH.